United States Patent [19]

Chaudhari et al.

[11] 3,876,389

[45] Apr. 8, 1975

[54] COMPOSITE MATERIAL, INCLUSIONS THEREOF, AND METHOD THEREFOR

[75] Inventors: Praveen Chaudhari, Ossining; James F. Freedman, Pleasantville, both of N.Y.; Zlata Kovac, Pittsburgh, Pa.

[73] Assignee: International Business Machines Corporation, Armonk, N.Y.

[22] Filed: Sept. 14, 1972

[21] Appl. No.: 289,021

Related U.S. Application Data

[63] Continuation of Ser. No. 51,285, June 30, 1970, abandoned.

[52] U.S. Cl. .................... 29/191.2; 29/199; 75/170; 161/186; 204/49

[51] Int. Cl. ........................ B32b 15/08; B32b 15/02

[58] Field of Search ................ 29/191.2, 191.4, 192; 75/DIG. 1

[56] References Cited

UNITED STATES PATENTS

| | | | |
|---|---|---|---|
| 1,381,460 | 6/1921 | Harris | 252/62.55 X |
| 3,073,728 | 1/1963 | Falk | 252/62.55 X |
| 3,411,960 | 11/1968 | Flur | 75/170 X |
| 3,427,185 | 2/1969 | Cheatham et al. | 29/191.4 |
| 3,451,934 | 6/1969 | Hubbard | 252/62.54 |
| 3,476,529 | 11/1969 | Dubin et al. | 29/191.2 X |
| 3,635,801 | 1/1972 | Bruch | 204/49 |

*Primary Examiner*—Allen B. Curtis

*Attorney, Agent, or Firm*—Bernard N. Wiener

[57] ABSTRACT

A composite material is provided by this disclosure which utilizes prior art host matrix materials with new resident inclusions for structural members with unique properties and applications. An illustrative embodiment of a composite material according to the principles of this invention is described with fiber inclusions fabricated by electroplating of a polycrystalline film on a substrate. Polycrystalline fibers are fabricated with a wide range of sizes to have strength approaching those of a single crystal whisker of the polycrystalline material. An illustrative composite material is fabricated with a host matrix of epoxy resin in which resident fiber inclusions are dispersed.

12 Claims, 12 Drawing Figures

INVENTORS
PRAVEEN CHAUDHARI
JAMES F. FREEDMAN
ZLATA KOVAC

BY

Bernard N. Wiener
ATTORNEY

COMPOSITE MATERIAL, INCLUSIONS THEREOF, AND METHOD THEREFOR

This is a continuation, of application Ser. No. 51,285 filed June 30, 1970, now abandoned.

BACKGROUND OF THE INVENTION

It is known in the prior art that microscopic single crystal "whiskers" have strengths which are orders of magnitude greater than those of corresponding bulk material specimens. It is known in the prior art that dislocations, a form of internal defects, are largely responsible for plastic flow in bulk specimens. The unusual strength of whiskers stems from the smaller probability of finding dislocations in specimens of material having micron dimensions laterally which are the dimensions characteristic of typical whiskers. Since single crystal whiskers must be kept small to preserve the high strength characteristics, the capability of exploiting their high strength has been a severely limiting factor except in composite materials wherein filaments of one material having inherent strength properties are embedded in other materials which serve as matrices. However, the cost of producing such materials has been relatively high and the resultant strength is approximately inversely proportional to the diameter and directly proportional to the packing density of the resident inclusions in the host matrix.

A useful background summary of the field of composite materials is entered in the journal Scientific American, Vol. 217, No. 3, page 160 (1967).

Composite materials with high performance are increasingly becoming important as practical engineering materials. Single crystal whiskers, glass filaments and graphite filaments are resident inclusions generally employed to impart desirable physical properties to a host matrix.

It is known in the prior art that thin metal films are inherently strong because of the difficulty of generating and moving dislocations in the fine grained structure. An illustrative literature reference on such films is the book "Physics of Thin Films," Vol. 3, Academic Press, 1966, page 216 et seq.

A composite material is a combination of two or more component materials in which the components retain their identities, but contribute to a property for the composite material which is a compromise in properties of the individual components which may be optimized for a given application. It may be described physically as a continuous phase of a host matrix material with the other resident material dispersed therein as an included phase. In the prior art the inclusions have been powders, fibers, whiskers and flakes as well as continuous layers in a laminate material. The inclusions have been universally dispersed in a random manner without a preferred orientation and they have been highly aligned and dispersed in a regular and repetitive pattern providing the composite with a particular directionality. Wood is a naturally occurring material in which component materials, cellulose fiber and lignin, are combined to provide different properties than either exhibit alone. Other examples of fabricated composite materials known in the prior art are concrete, safety glass, metals, and fiberglass. In recent years there has developed increasing need for composite materials with preferential properties suitable for particular applications. Among the composite materials which have been given increasing attention have been structural composite materials in which strong resident fibers are embedded in a plastic or metal host matrix such that the high strength and stiffness of the fibers have a preferential weight advantage over equivalent monolithic structures. Further, either the host matrix or the resident inclusion may be a metal, a ceramic or a plastic or other organic material.

There are requirements for structural members of data processing machines to meet the demands of higher operating speeds, lower weights, and greater reliability which are suitable for application of composite materials.

Several techniques have been utilized in the prior art to disperse and organize resident inclusions in a host matrix. Illustratively, for random dispersion, casting, powder metallurgy, and compression molding have been utilized and where a directional property has been required resident inclusion such as whiskers and fibers have been established on tapes of the host matrix which have been trimmed and stacked to give a desired shape to the ultimate structural member of the composite material. The stack is then pressed and heated to produce interlayer bonding by diffusion for a metal host matrix and resin flow and cure for a plastic host matrix. Other specific structural members have been fabricated by infiltration with molten metal or plastic resin, plasma spraying, electroforming, and coextrusion of an assembled member. Further, the properties of prior art composite materials are usually anisotropic which may be undesirable for certain applications.

Application of prior art composite materials has been limited because any specific property of a composite has represented an intermediate value lying between the values of the related properties of the two component materials and dependent on their relative percentages in the mixture.

The attempts of the prior art practice to predict the ultimate property of a composite material from the particular properties of the component resident inclusion have not been particularly successful. Apparently because of interactions between the host matrix and the resident inclusion which occur on the microscopic scale between the small sized residents and the more bulky hosts. This has required that partial structural members of a composite material be prepared and its physical property determined so that several such composite material members could be assembled for the ultimate structural member. This approach has become highly sophisticated for the design of aircraft structural members made from boron fiber-epoxy deposit tapes. Boron fiber structures have been extensively developed for use in the aircraft industry because their high strength and stiffness have a distinct weight advantage over equivalent metal structures. However, structures based on boron fibers had been too expensive for most commercial applications. The advantages of composite materials provided by the practice of this invention compared with boron fiber based on composite materials will be described in considerable detail hereinafter.

A deficiency of the prior art practice with composite materials has been the bonding between the host matrix phase and the resident inclusion phase especially at high temperatures. Sometimes inter-diffusion between the phases has formed brittle layers which crack under applied stress. It is known that boron fibers are especially subject to this difficulty and consequently have been coated with a barrier layer of silicon carbide to inhibit the inter-diffusion between the resident boron fiber and the host matrix of the epoxy. It has been recognized in the prior art practice that it is possible to design a composite material for optimizing two or more properties thereof which combines properties of several components without significant degradation of any one property. Illustratively, epoxy plastic resins possess particular strengths at room temperature for use in many kinds of short run tooling and are especially attractive therefor because of ease of fabrication. However, their thermal conductivities are extremely low and consequently heat tends to concentrate at the working surface because it cannot rapidly dissipate which tends to weaken the surface and permit rapid destruction of the tool. Thermal conductivity has been increased about 300% by adding approximately 30% by volume aluminum powder to the plastic without obtaining a marked change in physical strength.

Further, it has been recognized in the prior art practice that it is possible to vary controllably a physical property within a structural member to obtain localized enhancement of the property at one location relative to another location. This has been achieved by including an appropriate percentage and orientation of an inclusion of one strength or stiffness while maintaining in the remainder of the structural member a different percentage or orientation or a different resident inclusion material.

It has been recognized in the prior art that composite materials are desirable for application in data processing machine components because they have a variety of advantages in many combinations; low part cost, high strength, high rigidity, low density, good sound damping, good dimensional control and stability, and chemical resistance.

An exemplary background literature reference of interest for the practice of this invention is the noted article in the journal Scientific American entitled, "The Nature of Composite Materials," by A. Kelly. It is stated therein that the fibers of graphite and boron presently being used for practical applications are more than twice as stiff as steel and since they are less than a third as dense as steel they make a composite when included in a resin matrix which has a stiffness per unit weight much higher than for steel. The fibers are also very strong; they also exceed the strength of steel on a unit-weight basis. Composites consisting of carbon fibers in epoxy resin provide compressor blades in lightweight jet engines which are strong and stiff, and boron in epoxy resin is used for helicopter blades which turn at high speed. Further, tungsten wires have been introduced into metal matrices for use at temperatures of 1,000°C and higher and the metals cobalt and nickel are utilized for matrices because they do not oxidize readily at high temperatures Additionally, fibers of tungsten, silicon coated with carbon, graphite and boron are incorporated into matrices by electroplating. Alternatively, a matrix is chemically deposited on the fiber inclusions which avoids damaging them.

Another technique of providing composite materials has been explored in the prior art which makes the matrix and the resident inclusion reinforcing fiber therein in one operation by the controlled melting of certain metal alloys. Part of the alloy develops into parallel inclusions and part becomes a matrix for the inclusions. The resultant composite material has great strength and good heat resisting property. Illustratively, niobium carbide layers are formed as eutectic in a niobium matrix which has demonstrated high strength at temperatures up to 1,650°C.

The measure of the ability of a material to retain its strength from the presence of cracks is determined by the work of fracture of the material, i.e., the energy required to break it. Inherently strong materials such as silicon carbide, boron and graphite behave somewhat like glass in that their work of fracture is small so that they are quite vulnerable to the presence of cracks. Metals are normally used to bear large stresses because they accommodate to the presence of cracks. Polymeric material such as polyethylyne are also resistant to cracks although not so much so as metals. Both metals and polymers are much more resistant to cracks then ceramics because the interatomic forces in metals and the intermolecular forces in polymers do not depend on a particular direction of alignment to achieve strength. Further, the chemical bonds in the metals and polymers are unsaturated in that the atoms or molecules thereof are readily capable of forming new bonds, but ceramics have highly oriented forces and saturated bonds. The atoms or molecules in metals and polymers always slide over one another at the leading edge of a crack so that it does not penetrate the internal structure of the metal or polymer as easily as it can in a ceramic.

Heretofore, to utilize a ceramic in a composite material it has been necessary in the prior art to divide it into small pieces and to require a host matrix with several inherent properties. It must not damage the fiber inclusions by scratching them which results in cracks; it must act as a medium by which stress is transmitted to the fibers; it should be plastic and adhesive to the fibers; and it must deflect and control cracks in the deposit itself. It will be pointed out in considerable detail hereinafter that the practice of this invention permits use of matrices for ceramics which do not require so extensively these properties.

OBJECTS OF THE INVENTION

It is an object of this invention to provide a composite material including a matrix with fibers dispersed therein comprising polycrystalline films.

It is another object of this invention to provide a composite material including a matrix and fibers randomly dispersed therein comprising polycrystalline films.

It is another object of this invention to provide a composite material including a matrix and fibers dispersed therein in an oriented manner comprising polycrystalline films.

It is another object of this invention to provide a method for fabricating a composite material including polycrystalline films dispersed therein.

It is another object of this invention to provide a method for fabricating a composite material of the preceding object including the steps of providing a substrate material and depositing polycrystalline film thereon.

SUMMARY OF THE INVENTION

There are provided through the practice of this invention a composite material, inclusions thereof and method therefor. The composite material comprises a host matrix which is compatible with the resident inclusions. By making the resident inclusions as polycrystalline films, strengths for fibers comparable to those of single crystal whiskers are achieved. For certain embodiments of this invention, the polycrystalline films are retained on the substrates on which they are fabricated; and for other embodiments thereof the substrates are removed prior to including the polycrystalline films in a host matrix.

By preferentially establishing a plurality of layers of polycrystalline films of different materials and different orientations and different grain sizes, a complex fiber inclusion for a host matrix is fabricated with properties especially selected for a given application of the composite material. Further, by controlling the deposition parameters for the polycrystalline film, internal stresses selected from a spectrum from tension to compression are imparted to the polycrystalline films, which taken together with preferred orientations of the films when included in the host matrix provides a composite material with specially tailored properties.

In particular, the practice of this invention accomplishes a composite material by utilizing various deposition procedures for fabricating the polycrystalline films, e.g., sputtering, evaporation and electrodeposition. The orientation of the inclusions in a host matrix are preferentially established through imparting to the resident inclusions properties upon which externally applied field forces may operate, e.g., magnetic field, electric field and gravitational field.

Among the advantages of this invention are those which are related to the following consideration.

1. Data processing machines are available with composite materials according to the principles of this invention which have higher operating speeds, lower weights, greater reliability, and savings in fabrication costs.

2. Due to the practice of this invention, a composite material is readily fabricated which has physical properties which are especially tailored to a given application. A complex fiber may be readily fabricated which has therein a material for aligning the resident inclusions in a host matrix, e.g., ferromagnetic material for aligning the fiber in an applied magnetic field. Further, fibers having graded dimensions, e.g., conical shape, may be fabricated which will establish a preferred orientation in a fluid host matrix during fabrication of a composite material due to the gravitational field. By having several different polycrystalline materials in layers in the fiber various sizes, properties and strengths may be tailed to meet the specific requirements of a given application without altering the basic density or other structural property of a composite material. tailored 3. New structures not heretofore available may be fabricated through the practice of this invention because the use of polycrystalline films as resident inclusions in a host matrix makes possible distinctly tailored properties for a given application.

4. A specific property of a composite material achieved through the practice of this invention is not limited to an intermediate value of a given property between the comparable property of the component thereof as required by the prior art practice, e.g., through this invention it is possible both to preferentially align fiber inclusions and to tailor them for a given internal stress.

5. The stringent requirement of the prior art practice of bonding the host matrix to the resident inclusions of a composite material is especially obtained through the practice of this invention by preferentially depositing a layer of advantageous bonding material on the fiber inclusions and by establishing the surface of the fiber inclusions with preferred orientations which obtain especially good bonding properties between the host matrix and the resident inclusions.

6. Structural materials are obtained through the practice of this invention which are usually equivalent to and sometimes better than conventially prepared boron fibers for use in aircraft structures and which are desirably less expensive.

7. In certain preferred embodiments of this invention it is desirable to provide a composite material in which both the host matrix and the substrates for the crystalline films are of the same material, e.g., epoxy. If special internal stress has been imparted to the polycrystalline film during growth thereof on its substrate, the fabrication procedure for establishing the resident inclusions in a host matrix is carefully controlled so that the substrate is not freed from the polycrystalline film and the joinder between the substrates and the host matrix is accomplished by a minimum of melting on the interface between the substrates and the host matrix. Further, through the practice of this invention, it is now possible to have a completely homogeneous chemical material in different physical states in regions thereof. Illustrative by fabricating resident inclusions comprising polycrystalline films of copper either on substrates of copper or on substrates which are thereafter removed, and thereafter establishing the resident inclusions of copper in a copper matrix by electroplating, resultant copper composite material is created with physical and electrical properties distinct from any within the capability of the prior art practice.

8. The requirement of the prior art for compromise in the strength property of a composite material in order to achieve other than anisotropy therein is relieved through the practice of this invention. Fiber inclusions FIG. provided hereby which have various combinations of internal stresses and layers with different physical properties. Further, interdiffusion between the host matrix and the resident inclusions of a composite material according to the principles of this invention is readily minimized by depositing a barrier material on each of the resident inclusions which does not detract significantly from the physical property imparted to the composite material by the resident inclusions, but does minimize the interdiffusion. Further, the barrier layer may itself be polycrystalline in character so as to contribute also to the strength property of the composite material.

9. Because of the flexibility of fabrication of resident inclusions in fiber form, the principles of this invention permit several different fibers to be fabricated such that distinct properties may be imparted to a composite material with a complex dispersion of fibers therein so as to tailor the ultimate property of the composite material and take advantage of inherent properties of a particular host matrix. For a given type of resident inclusion, the prior art was limited in obtaining different strength properties of an ultimate composite material by having available only the parameter of size of the inclusions. In contrast, the practice of this invention permits use of crystallinity of the inclusions which taken together with size thereof, permits tailoring a given composite material to a particular application requirement.

Because extended length of fibers are readily obtained through the practice of this invention, various fiber configurations are possible through use of techniques from the fabric industry. Accordingly, the resident inclusions for an ultimate composite material may be fabricated as an extended fabric within which the host matrix is dispersed by conventional procedures.

Further, the substrate for a continuous fiber according to this invention may itself have a physical structure which permits construction of an ultimate structural member from a composite material in a manner not heretofore achieved. Illustratively, by using substrate fibers it is possible to use the techniques from the fabric industry to construct a framework which may be extended in form in a mold for a complex shape part within the substrate and thereafter deposit the host matri throughout the shape of the structural member.

10. The practice of this invention permits preferential enhancement of a physical property locally so that a given physical property is obtained in a composite material while maintaining a different physical property elsewhere therein. In the prior art it has been possible to take advantage of an appropriate percentage in orientation of an inclusion in one region while the strength or stiffness is maintained in the balance of a part with a different percentage or even with a different inclusion material. These requirements of the prior art are relieved in that the same physical material is tailored through the practice of this invention to have different metallurgical properties for different regions of a composite material.

11. Because it is now possible through the practice of this invention to fabricate desirable fiber inclusions of most materials, it is now possible to obtain bonding of a host matrix to the fiber inclusion by diffusion without changing the basic strength of the fiber. Further, it is not possible to make fibers with strengths comparable to those of single crystal whiskers which have dopants dispersed therein of a concentration required by the phase diagram relationship between the host matrix and the resident inclusion at an operational temperature such that the materials are essentially homogeneous in terms of material but heterogeneous in terms of physical properties.

12. Through the practice of this invention various combinations of host matrices and resident inclusions are obtained for consequent low part cost, high part strength, low part density, good sound damping property, good dimensional control and stability of a part, and good chemical resistance.

13. Composite materials are provided by the practice of this invention which retain the optimum properties of both host matrix and resident inclusion without requirement of a compromise. Illustratively, it is possible through the practice of this invention to tailor a composite material to have a gradient of property from that obtained by single crystal whiskers to that obtained by eutectic inclusions.

14. The prior art tendency for cracking of ceramic inclusions in a host matrix can be mitigated by the practice of this invention by preparation of complex fibers wherein the ceramic fiber is coated with a polycrystalline metal film. Therefore, it is possible to utilize ceramics for composite materials in a manner not within the capability of the prior art. The requirements for a host matrix with regard to ceramic inclusion that it not scratch the inclusion, that it transmit stress to the fibers plastically and have good adhesive properties thereto, and that it must reflect and control cracks in the composite itself are now relieved since an intermediate material can be readily established on the surface of the ceramic inclusions.

15. Whereas the practice of the prior art required a compromise between the properties for compression and tension, it is possible through the practice of this invention to provide composite materials which are suitably strong in both tension and compression without sacrificing in either respect.

16. Whereas in the prior art it has been necessary to provide laminate materials in order to impart resistance to a composite material against compression stress, it is possible now by appropriate dispersing of a given inclusion and by tailoring the inclusion itself to mitigate the requirement for the noted compromise requirement of the prior art practice.

17. The described properties of single crystal whiskers are obtained by the practice of this invention by provision of polycrystalline films. Further, it is possible by this invention to provide composite materials with various constant and different properties at a spectrum of operating temperatures.

18. Because of the capability in the practice of this invention of fabricating any length of fiber, varying from extremely short to an extended length of fiber, any fabrication technique usually restricted to selected materials is applicable to composite materials provided by the practice of this invention. The rigidity imparted to extended lengths of composite material by the practice of this invention permits fabrication of various geometrically shaped composite materials. Illustratively, it is possible to wind extended lengths of the complex resident inclusions provided by this invention on a drum and then form the composite material around the drum to provide a cylinder which is strong circumferentially.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 5A and 5B are schematic perspective views of apparatus useful for the practice of this invention wherein oriented fibers are dispersed in a composite material as illustrated in FIG. 3 in the presence of an externally applied magnetic field and wherein FIG. 5A shows the composite material before the application of the magnetic field and FIG. 5B shows it after the resident inclusions have been preferably oriented.

DETAILED DESCRIPTION OF THE DRAWINGS

Prior Art

Figure 1A:
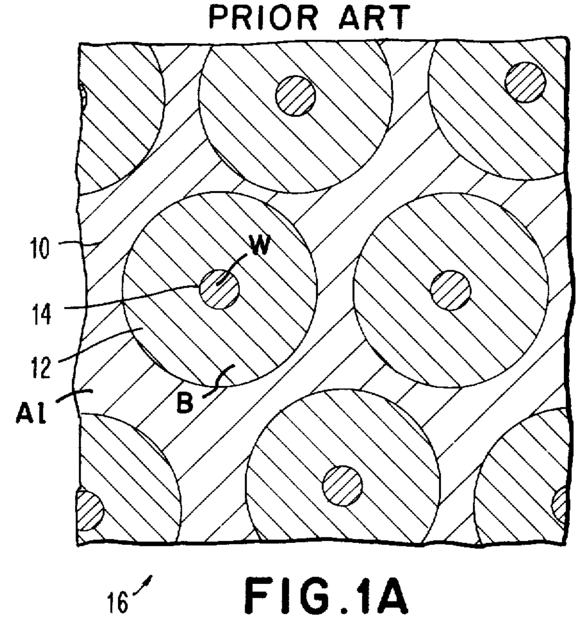
FIG. 1A is a cross-sectional end view of a portion of a prior art composite material with host matrix of aluminum and resident inclusions of boron fibers established on tungsten wires by decomposition of boron-chloride or boron-bromide.

In order to have a basis for comparison of the distinct features of this invention as described with reference to FIGS. 2 to 8, comments will now be presented concerning the prior art with reference to FIGS. 1A and 1B.

A composite material is described in the noted article in the Scientific American, Vol. 217, No. 3, page 160 (1967) which describes a host matrix of aluminum with boron fibers dispersed therein in oriented direction. FIG. 1A is illustrative of this development wherein the host matrix 10 of aluminum supports fiber inclusions 12 of boron deposited on tungsten wires 14. The consequent composite material 16 is shown in FIG. 1A as a sectional view of a portion of a structural member. As described in the noted Scientific American article, boron is used as a structural material because of its high strength to weight ratio. Given steel and boron as two materials of the same diameter of fiber, boron exhibits a higher strength to weight ratio than steel. Therefore, it has been preferable for the same application to use a larger diameter boron wire than a fine steel wire as resident inclusion in a host matrix. The boron fiber is made by decomposing boron chloride or boron bromide on a tungsten filament. By heating the tungsten wire, the boron chloride or bromide decomposes leaving boron behind. In order to obtain high load bearing capability for the composite material of host matrix aluminum and resident inclusions of boron, the amount of boron on the tungsten wire is quite large.

Polycrystalline films are known in the prior art to have high strength property relative to bulk material of the same composition. An illustrative background is "Physics of Thin Films," G. Haas et al., Academic Press Inc., New York, 1966, Vol. 3, page 211 et seq. The mechanisms of stress relief in thin films is addressed in papers by P. Chaudhari and P. Chaudhari et al., respectively, in IBM Journal of Research and Development, Vol. 13, No. 2, March 1969, page 197 et seq., and the Journal of Vacuum Science and Technology, Vol. 6, No. 4, 1969, page 619–621. Essentially the mechanism by which stress is relieved in the films is described as due to dislocations. FIG. 1B is a graphical representation of a plot exemplary of theoretical considerations of normalized stress, i.e., $\sigma/\mu$ = stress/sheer modulus, required to form a dislocation loop in a hexagonal grain as a function of edge length of the grain. By using the normalized stress parameter, a comparison of strengths is approximately valid for all materials on a common scale. The normalized stress plotted versus grain size is shown as a band in FIG. 1B based on the formulation in the noted article in the Journal of Vacuum Science and Technology by P. Chaudhari et al. From this formulation of the stress required to form a dislocation, it is apparent that the smaller the grain size of the material, the greater is the stress required to effect dislocation movement and propagation.

Tensile measurements in the prior art have shown that thin metal films are stronger than bulk material. Calculations made for the practice of this invention indicate that the stress required in typical polycrystalline films, for plastic flow approaches that observed in the prior art for whiskers, i.e., about 145,000 pounds per square inch ($10^{10}$ dynes/cm$^2$). The high internal stresses found in many thin films indicate that such stress-relieving mechanisms as plastic flow do not readily appear.

In view of the high surface-to-volume ratio and the fine grain structure of thin films, it has been suggested in the prior art that the lack of plastic flow was a consequence of difficulty in nucleating and generating dislocations which would relieve stress flow. A theoretical elasticity analysis in the prior art produced a set of equations expressing the energies and stresses involved in the formation of several types of dislocation loops, distinguished by their neighboring environment. The values obtained are of the same order of magnitude as those observed experimentally. A consequence of this formulation, readily observed in the plot of loop-formation stresses down in FIG. 1A as the shaded band is the interdependence of the material's grain size and the stress required to induce dislocation activity in it.

Preferred Embodiment of Invention

Figure 2:
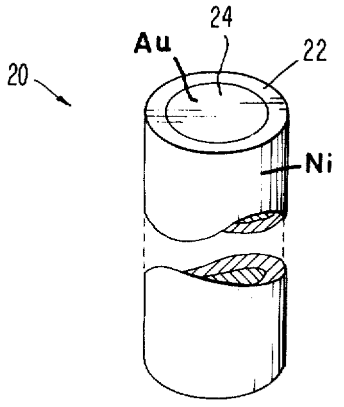
FIG.2 PRIOR ART
FIG. 2 is a perspective view of the polycrystalline fiber in accordance with the principles of this invention supported by a substrate illustrating the manner in which the fiber is supported prior to inclusion in a composite material.
Figure 3A:
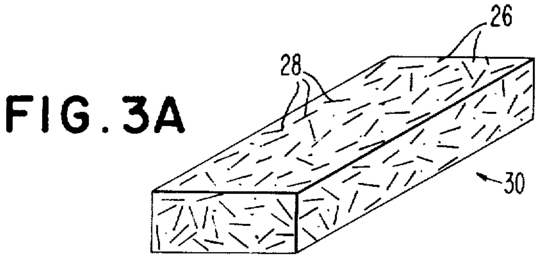
FIGS. 3A, 3B and 3C present idealized pictorial views of exemplary composite materials useful for the practice of this invention wherein fibers of the nature set forth in FIG. 2 are randomly oriented in FIG. 3A and are uniaxially oriented in FIG. 3B and are uniaxially oriented in FIG. 3C as continuous fibers throughout the overall length of a composite material example.
Figure 3B:
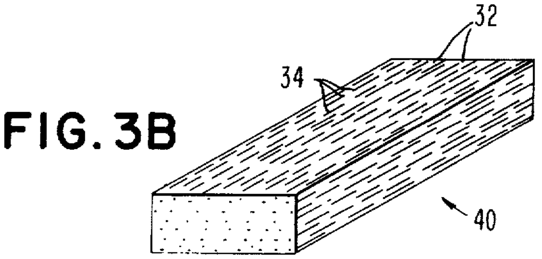
Figure 3C:
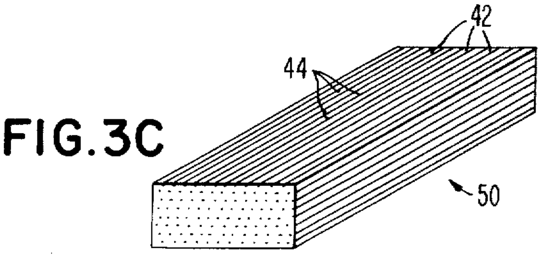
FIG.3C PRIOR ART

An example of a fiber resident inclusion for a host matrix is illustrated as a perspective view of a complex fiber in FIG. 2. The fiber segment 20 of FIG. 2 comprises a polycrystalline film 22 deposited on a wire substrate 24. The polycrystalline character of the film 22 is established in accordance with the desired strength property for the fiber inclusion 20 for composite materials in accordance with the principles of this invention. Fiber inclusions 20 of FIG. 2 are dispersed in a host matrix 26 of FIG. 3A as randomly dispersed fibers 28 to obtain composite material 30. In FIG. 3B the fibers are oriented directionally in the host matrix 32 as oriented fibers 34 to provide composite material 40. In FIG. 3C extended fiber inclusions of the character of fiber inclusion 20 of FIG. 2 are oriented directionally in a uniformly spaced fashion in host matrix 42 as directionally aligned fibers 44 to provide composite material 50.

Therefore, by depositing small grained and low stress polycrystalline films on conventional substrates, comparatively simple structures far larger than whiskers are produced whose strengths are comparable to the strength of whiskers. Apparatus for fabricating complex fiber inclusions of the character illustrated in FIG. 2 is shown schematically in FIG. 4, wherein a wire substrate 60 is established as cathode 60 of an electroplating arrangement 62 including a cylindrical anode 64, and electrolyte 66 in container 68. Wire anode 60 is connected by the conductor 70 and ammeter 72 to the negative terminal 74 of battery 76. The electrical circuit from battery 76 is closed via positive terminal 78, conductor 80, variable resistance 82 and switch 84 to cylinder anode 64. Voltmeter 86 is connected between negative terminal 74 of battery 76 and the juncture 88 between switch 84 and variable resistance 82. By monitoring the current and voltage conditions for the electroplating arrangement 62, a preferential layer 22 of polycrystalline film is deposited on substrate wire 24.

Exemplary film fiber composites produced by the practice of this invention consist of gold wires 20, 5.2 mils in diameter and 1 inch long, around which are electroplated jackets 22 of nickel polycrystalline film as shown in FIG. 2. By using suitable additives to the electroplating bath 66 of FIG. 4, e.g., saccharin, and using relatively high current densities to achieve fast deposition, low stress films are obtained of extremely small grain size ≈200°A.

The preferred embodiment fiber inclusion 20 of FIG. 1 was obtained under the following conditions: plating solution – 218 g/l $NiCl_2 \cdot 6H_2O$, 25 g/l $H_3BO_3$, 1.64 g/l Na-saccharin and 10 drops of saturated solution of 2-butyne 1, 4 diol, 75 ma $cm^{-2}$, 40°C, pH = 3.5. Ultimate tensile strength values in excess of $10^5$ psi were obtained on 5 mil Ni deposits 22 on a 5 mil Au wire 24. This is equivalent to an effective strength $\sigma/E - 5 \times 10^{-3}$, where $\sigma$ is the applied stress and E the Young's modulus, for the Ni electroplate 22, a value comparable to the literature value for a Ni whisker.

It will be recognized by one skilled in the art that the concentration of the solution may be varied or alternative additives and solutions may be used. The practice of the invention provides for the optimization of additives to effect the preservation of extremely small grain sizes with zero stress (or a compressive or tensile stress depending upon the specific desired design). An important consideration for the practice of this invention is the need for a very smooth surface on a microscopic scale, since any notches or other roughness may act as stress risers with a consequent apparent low stress failure strength.

In the practice of this invention a substrate is used which may be a wire, e.g., gold, on which is deposited nickel and what is desired is a very fine grained nickel film or any other deposited film and the strength is substantially independent of the diameter of the deposit. Therefore, it is possible in accordance with the principles of this invention to optimize the strength of a given material. The substrate is used for holding the evaporating or depositing metal or providing a place for the depositing metal to deposit on. Actually, the substrate may be removed after the deposit has been made and subsequently deposit may be carried on on the deposited material itself. The properties of the substrate are not manipulated in any way.

Single crystal materials have high strength only when they contain no dislocations. Since crystal whiskers which are used in composite materials have a high strength because the dislocation density therein is extremely small and ideally approaches zero. The strength of the material approaches its theoretical strength which is determined by the elastic constants of the material. In polycrystalline films, high strength is achieved according to the principles of this invention by making the grain size so small that any dislocations present cannot move beyond the diameter of the grain. In very small grain size materials dislocations are not present and the stress required to create them is very high and approaches that of the elastic limit. Due to a combination of these two conditions the overall strength of a very fine grain material is very high.

The strength of the resident fiber inclusion provided by the practice of this invention is basically independent of diameter as demonstrated by examples in which various thicknesses of nickel from 0.08 to 4.7 mils were deposited around 5.2 mil gold wire cores. Tensile strengths for two exemplary fibers, with nickel thicknesses of 2.5 and 4.5 mils, were 119,650 and 154,140 pounds per square inch, respectively. The ratios of parting stresses corresponded closely to the ratios of cross-sectional areas of the nickel film deposited. When normalized, the data gave almost identical values for the nickel alone as 200,000 per square inch. Measurements made on examples of this invention for the practice thereof have demonstrated size-independence. The upper limit of film thickness for which it holds true is unknown but should be unlimited. The highest tensile strength of prior art cold-rolled nickel is approximately $0.002\mu$, where $\mu$ is the shear modulus. The upper limit of this value for single crystal nickel whiskers is about $0.03\mu$. For the electroplated nickel films of this invention, values range from about $0.005\mu$ to a highest value of approximately $0.01\mu$. Since the figure cited for whiskers is an upper bound, the resident inclusions of this invention have strengths more approximate to those of whiskers than to those of the bulk material in the cold-worked state.

Figure 1B:
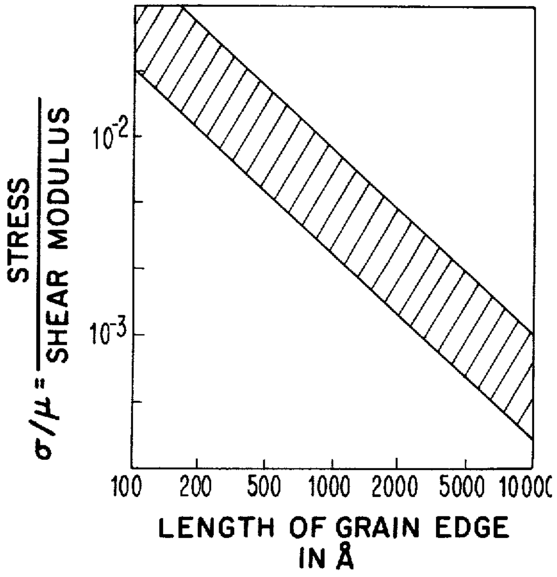
FIG. 1B is a graphical representation of theoretical considerations concerning the relationship between normalized strength of a material and size of the polycrystalline grains therein.

Criteria for grain size and strength capability for polycrystalline material for the practice of this invention are readily determined from the theoretical data of FIG. 1B. The grain size of an actual polycrystalline material according to this formulation is measured by the length of an edge of the smallest hexagon which can encompass the largest section (sectional cut) of the grain. Preferably, the grain size is less than approximately 5,000A and the ultimate normalized strength is approximately in the range $10^{-3}$ to $6 \times 10^{-2}$. The ultimate normalized strengths of single crystall whiskers fails approximately in the range $2 \times 10^{-2}$ to $6 \times 10^{-2}$. As exemplary range of grain size polycrystalline films for the practice of this invention with composite materials is approximately 100A to 5,000A. Conventional bulk material has ultimate normalized strength less than approximately $10^{-3}$.

The ultimate normalized strength value of a test specimen of a material is derived from the highest value thereof due to change in dimension under applied stress, e.g., it is the highest normalized tensile strength value of a specimen achieved during tensile test to fracture. The normalized strength of a material is the strength of the specimen divided by an elastic constant, e.g., the shear modulus.

Practice of the Invention

Figure 5A:
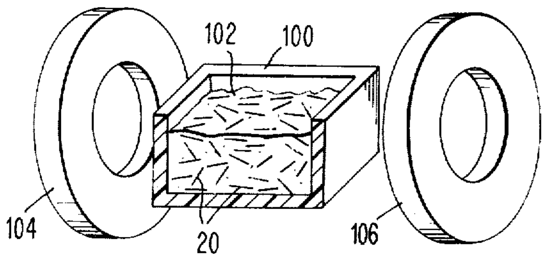
Figure 5B:
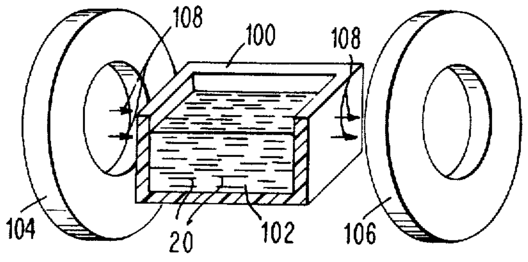

The manner in which fibers provided by the practice of this invention are included in a host matrix in an oriented fashion will be described with reference to FIGS. 5A and 5B. In FIG. 5A container 100 contains epoxy host matrix 102 and fibers 20 dispersed in random fashion therein. Magnetic field coils 104 and 106 are shown on either side of container 100 to establish Helmholtz coils for providing a magnetic uniform field in container 100. Control and energy circuitry are not shown in FIG. 5A. In FIG. 5B the Helmholtz coils 104 and 106 are shown in energized condition providing magnetic field 108 which has aligned the fibers 20 along the direction of the magnetic field.

Figure 6:
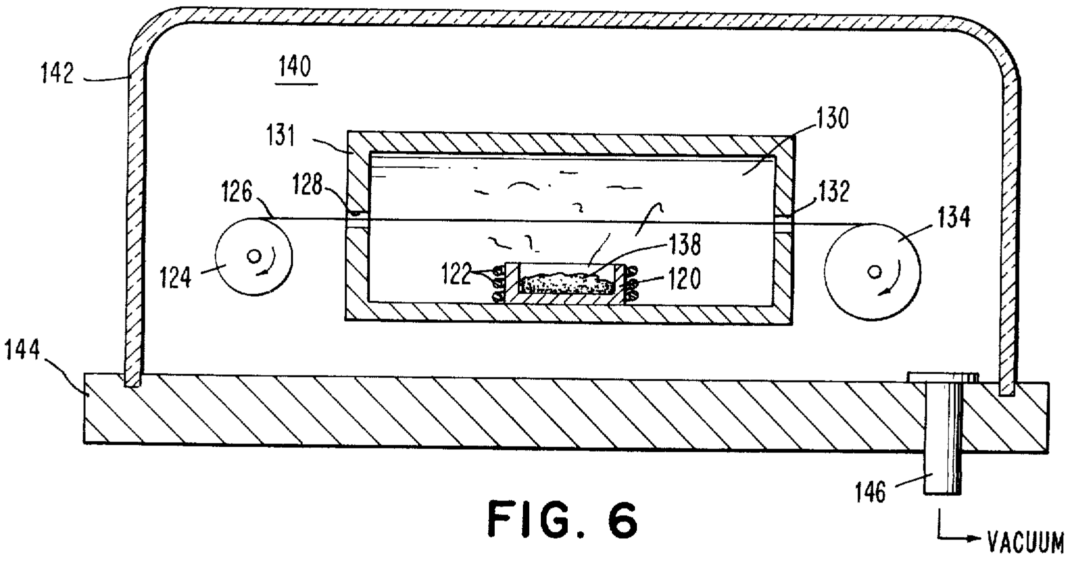
FIG. 6 is a schematic sectional view of apparatus suitable for the practice of this invention for providing extended fibers according to FIG. 2 by vapor deposition of the crystalline material on a moving thread of substrate material.

The manner in which a continuous thread of plastic is coated by vapor for various embodiments of this invention will be described with reference to FIG. 6. In FIG. 6 a hearth 120 has heating coils 122 would thereabout. Thread spool 124 provides thread 126 via orifice 128 to evaporation chamber 130 defined by housing 131 and after evaporation is wound via the orifice 132 on spool 134. Inside chamber 130 is hearth 120 with evaporant 138 therein. The spools 124 and 134 and chamber 130 are established in vacuum chamber 140 defined by bell jar 142 on base plate 144. Chamber 140 is evacuated to vacuum via orifice 146 by a vacuum pump, not shown. Illustratively, thread 126 is polyethylene terephthalate resin and evaporant 138 is nickel.

Figure 4:
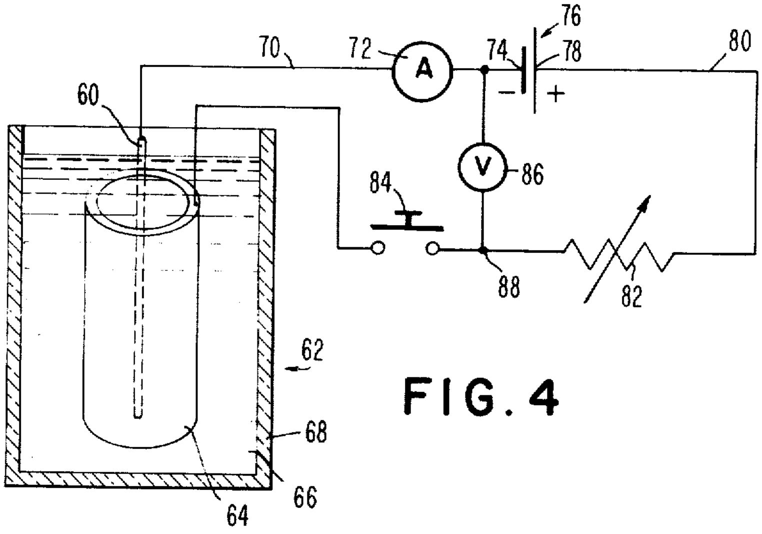
FIG. 4 is a partially schematic and sectional view drawing of apparatus suitable for fabricating fibers for the practice of this invention as illustrated in FIG. 2 wherein a metallic substrate is plated with a polycrystalline film.

With reference to FIG. 4, by suitably varying the composition of the electrolyte bath 66 the intrinsic internal stress in the electroplated film 22 (FIG. 1) on substrate wire 60 is controllably established. In this manner, a particular inclusion may be fabricated to have an internal intrinsic stress selected from a spectrum of stresses from compression to tension. An illustrative prior art literature article disclosing techniques for imparting a spectrum of internal stress to thin films is "Intrinsic Stress in Fabricated Films," by E. Klokholm et al., Journal of Electrochemical Society, Vol. 115, No. 8, Aug. 1968, page 824. From such prior art studies it is known that the intrinsic internal stress is related to the growth of the film and that when the substrate is removed or is plastically deformed, the intrinsic internal stress is markedly altered. Resident inclusions incorporating polycrystalline films in accordance with the principles of this invention having special intrinsic internal stress permit fabrication of composite materials especially adapted foir particular stress loads. Illustratively, by fabrication of resident inclusions to have intrinsic compression stress, and orienting them directionally in a host matrix to which tension stress is to be imparted along the direction of orientation of the inclusions, it is possible to obtain a composite material more resistant to tensile force than would be predicted based upon the inherent tension properties of the host matrix and the resident inclusion. It is shown in the prior art of which the noted article by E. Klokholm et al is illustrative that the intrinsic internal stress in the film may be varied in accordance with control of deposition conditions, e.g, temperature of substrate.

Further, by varying the deposition or electroplating conditions during growth of a given film for a resident inclusion, it is possible to vary the intrinsic internal stress in a manner to provide bending moments in the complex resident inclusion which when established preferentially in the host matrix permits the resultant composite material to resist beneficially an applied bending moment.

Sputtering is an especially suitable technique for fabricating resident inclusions for the practice of this invention. Sputtering is a well known technique for producing thin films. Among the conventional sputtering methods are DC sputtering, AC sputtering, and RF sputtering. In DC sputtering, a DC potential of approximately 1,500–3,000 volts is applied between the target and a grounded anode. DC sputtering is generally used for conductive materials, in which the target is also the cathode. A continual bombardment of the target by ionized gas atoms causes target material to be removed and deposited on the substrate, which is located adjacent the anode electrode.

In AC sputtering, a low frequency potential, e.g., approximately 60 cycles per second, is applied between the target and the anode and there is a small amount of sputtering from the anode (substrate) in addition to the sputtering which occurs from the target electrode. However, the duty cycle and the applied potential are adjusted so that most of the sputtering is from the target, with the result that there is a net deposition of target atoms on the substrate. An advantage of AC sputtering is that the sputtering can be made asymmetric, so that there is sputtering both from the substrate and from the target. This provides a cleansing of the substrate deposition and leads to more pure deposits.

In a radiofrequency sputtering system, radiofrequency voltages waves, e.g., about 13.56 megahertz, are applied between the target and the anode. Radiofrequency sputtering is desirably used to deposit insulating materials. A target insulator can be made negative with respect to a substrate anode so that a glow discharge can be established therebetween. Radiofrequency sputtering is not usuallly used to deposit metals. However, radiofrequency sputtering of conductive metals is known in the prior art.

Further, it is also known in the prior art to provide a bias on the substrate of a growing film, in order to obtain cleansing thereof during deposition. A negative potential is applied to the substrate so that positive gas ions will bombard the growing film and release impurities from it. This substrate bias technique has been used in both direct current and radiofrequency systems, and has generally been approximately 100 volts negative substrate bias.

Figure 7:
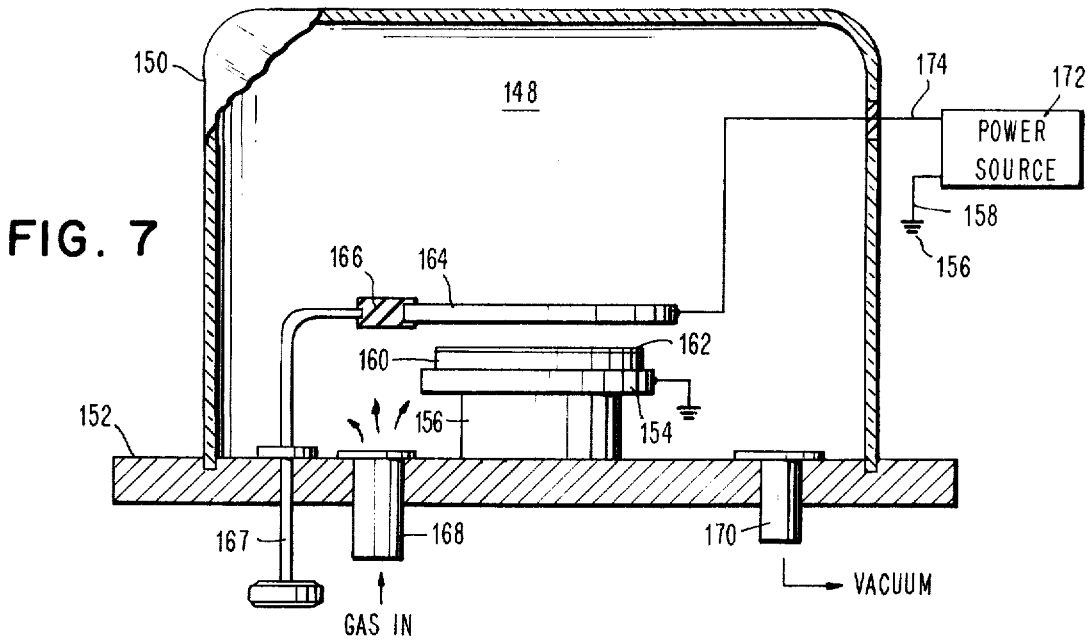
FIG. 7 is a schematic sectional view partially cut away illustrating the fabricating by sputtering of a resident inclusion plate for the practice of this invention.

Exemplary apparatus for fabrication of a resident inclusion for the practice of this invention by sputtering technique is illustrated in FIG. 7 wherein a vacuum enclosure is established within bell jar 150 which is secured to base plate 152. Support anode 154 is mounted by support member 156 on base plate 152 and is connected to ground 156 by conductor 158. Substrate 160 is placed on anode 154 upon which film 162 is deposited by sputtering. Cathode 164 is supported in an insulated manner by insulator bracket 166 and support structure 167 via base plate 152. The gas for the sputtering operation is introduced into chamber 148 via orifice 168 and enclosure 148 is evacuated to vacuum condition by a vacuum pump not shown via orifice 170 and base plate 152. Power source 172 is connected via conductor 174 to cathode 164. Power source 172 may readily be the appropriate power source for DC sputtering, AC sputtering or RF sputtering in accordance with the conventional prior art as described hereinbefore. Illustrative details of prior art sputtering apparatus are presented in copending application Ser. No. 837,738, filed June 30, 1969, and commonly assigned. Illustratively, the grain structure of the film 162 produced by the apparatus of FIG. 7 is controlled for the practice of this invention by control of the temperature of substrate 160.

Figure 8:
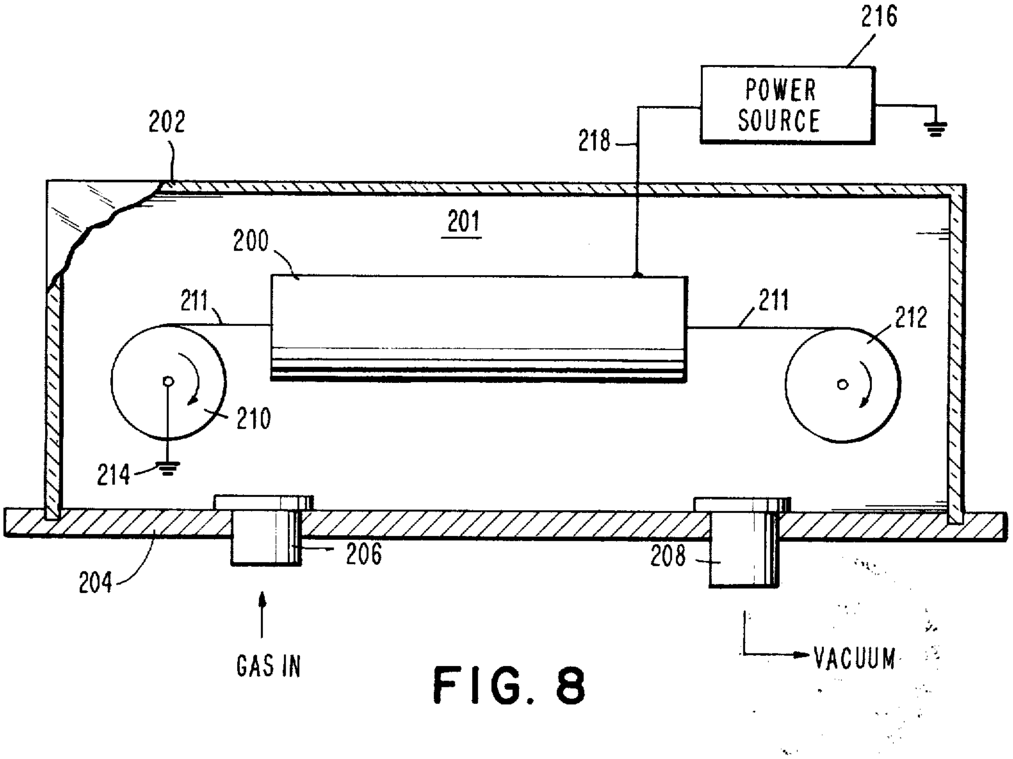
FIG. 8 is a schematic sectional view partially cut away illustrating the fabricating by sputtering of a resident inclusion extended wire for the practice of this invention.

FIG. 8 illustrates another apparatus for sputtering to obtain extended resident inclusions in wire form for the practice of this invention with composite materials. Illustratively, a nickel cylinder 200 is established in vacuum chamber 201 defined by bell jar 202 and base plate 204. The gas for sputtering is introduced via orifice 206 and the vacuum is established in the chamber via orifice 208 by a conventional vacuum pump, not shown. The substrate wire to be plated by sputtering is derived from input reel 210 which communicates it to output reel 212. Reel 110 is shown as grounded at 214. The voltage source 216 is electrically connected to cylinder 200 via connector 218. Voltage source 116 may be direct current, alternating current or radiofrequency for sputtering in accordance with the conventional prior art noted hereinbefore. Through use of the apparatus of FIG. 8, a wire 211 may be either conductor or nonconductor and be coated with polycrystalline film in accordance with the principles of this invention. In the case of a nonconductor a prior thin coating of conducting material enables the establishment of sputtering conditions.

Theory of the Invention

The nature of prior art theoretical considerations concerning the function of the host matrix in transmitting stress to the resident inclusions in a composite material will now be summarized. Composite materials having the higher strength have contained aligned fiber inclusions. According to the principle of combined action, when such a composite material is stretched parallel to the direction of the fibers, the strains in the fiber and in the matrix are virtually equal. Strain is the distortion of the material when it is under stress and is expressed in terms of the change of the original shape of the material and stress is the externally applied force giving rise to the strain and is measured in force per unit area, e.g., pounds per square inch. Therefore, the prior art host matrix has been selected so that it yielded or flowed in a plastic manner. Accordingly, when the fibers and the matrix are under equal strain, the stress within the fibers is significantly greater than in the matrix such that in calculating the breaking strength of the composite material, the contribution of the matrix is usually regarded as negligible.

Some of the fibers which are highly stressed will break because of cracks therein. However, in the usual composite material the presence of such a crack is usually unimportant since the propagation of the crack through the brittle reinforcing material is hindered by the softness of the host matrix.

Cracks are also prevented from running through a composite material because of a few other effects. Although certain of the reinforcing resident fiber inclusions may fail due to the high stress imparted to the composite material it may do so in different planes. For a crack to extend through a composite material, the fibers therein would have to to be pulled out as each broke. However, work must be performed by the applied stress to pull out the fibers against the holding force thereon of the host matrix. Therefore, the holding force of the matrix on the fibers increases the resistance to crack propagation among the fiber inclusions. The work required to pull out a fiber makes a large contribution to the work of fracture in composite materials consisting of brittle fibers as resident inclusions in a resident host matrix which is a true property of the composite material and is not attributable to a property of either component alone.

Another effect for controlling cracks in a composite material is due to the adhesion between the fibers and the matrix. The composite material is weak in a direction perpendicular to the fibers which is an advantage because the crack is deflected along the weak interface as it starts to run perpendicular to the fibers and it is not deleterious to desirable properties parallel to the direction of orientation of the fibers in the host matrix.

For a composite material with resident fiber inclusions oriented in the host matrix, the application of compression causes breaks in the fibers due to buckling and shear. For the fibers to resist buckling under compressive loading, the stiffness of the fibers should be maximum and the interface between the fibers and the matrix should have a high tensile strength to resist splitting. However, for the composite material to resist cracking under tension a weak interface is required between the fiber and the matrix. Therefore, a composite material heretofore has required a compromise between both tension and compression properties of the resident fiber inclusions.

Further, the practice of the prior art has required a compromise to impart shear resistance to a composite which is angled to the fibers. For both shear stress and compression stress, a prior art composite is usually less strong than when it is under tension stress, i.e., the strength of a composite tends to be highly directional in relationship to the orientationship of the fibers therein. Heretofore, to reduce the weakness of a composite material under compression stress and shear stress, lamination has been resorted to in the prior art. Illustratively, plywood is a laminate composite material which has resistance against both compression and shear damage. In the prior art variously aligned layers are molded to provide strength in a number of directions, but the laminated composite material is weaker in a particular direction than if all the fibers were aligned in one direction.

Since the host matrix of the composite material imparts stress into open fibers, the principle of combined action is effective even if all of the fibers are broken. Therefore, a composite material may include short lengths of fiber none of which is continuous throughout the entire host matrix. Therefore, multi-directional strength may be imparted to a composite material by aligning the fibers in the various directions, e.g., randomly. Although the strongest materials known heretofore are single-crystal whiskers, it has not been practical to provide a commercially suitable whisker reinforced composite material for practical structures.

What is claimed is:

1. A composite material for a structural member comprising a given host matrix and a plurality of given resident inclusions therein which impart strength property to said member, each said resident inclusion including polycrystalline metallic material in film form whose grain size is such that its ultimate normalized strength is greater than the value of ultimate normalized strength for the bulk material comparable to said polycrystalline material, wherein the grain size of said polycrystalline material is less than 200 A and the ultimate normalized strength of said polycrystalline material is in the approximate range of $10^{-3}$ to $6 \times 10^{-2}$.

2. A composite material as set forth in claim 1 wherein said grain size is approximately in the range of 100 A to 200 A.

3. A composite material as set forth in claim 1 wherein said polycrystalline material has ultimate normalized strength approximately in the range of $2 \times 10^{-2}$ to $6 \times 10^{-2}$.

4. A composite material as set forth in claim 1 wherein said ultimate normalized strength of said polycrystalline material is substantially equal to the theoretically obtainable value of ultimate normalized strength therefor.

5. A composite material as set forth in claim 1 wherein said ultimate normalized strength of said polycrystalline material is substantially equal to the value of ultimate normalized strength for a single crystal whisker of said latter material.

6. A composite material as set forth in claim 1 wherein said polycrystalline material has a given geometrical shape.

7. A composite material as set forth in claim 6 wherein said geometrical shape is selected from the group consisting of plate, wire and flake.

8. A composite material as set forth in claim 1 wherein said resident inclusions are polycrystalline films established on respective substrates.

9. A composite material as set forth in claim 8 wherein said polycrystalline film is Ni and said substrate is Au.

10. A composite material as set forth in claim 8 wherein said host matrix is selected from the group consisting of metal and polymer.

11. A composite material as set forth in claim 10 wherein said metal is A1.

12. A composite material as set forth in claim 10 wherein said polymer is epoxy.

* * * * *